United States Patent [19]

Parker et al.

[11] Patent Number: 5,424,356
[45] Date of Patent: Jun. 13, 1995

[54] PROCESS FOR THE PREPARATION OF HYDROGENATED RUBBER

[75] Inventors: Dane K. Parker, Massillon; David M. Ruthenburg, Akron, both of Ohio

[73] Assignee: The Goodyear Tire & Rubber Company, Akron, Ohio

[21] Appl. No.: 210,856

[22] Filed: Mar. 21, 1994

[51] Int. Cl.$^6$ .............................................. C08L 39/00
[52] U.S. Cl. .................... 524/555; 524/571; 524/828; 525/329.1; 525/329.2; 525/329.3; 525/380
[58] Field of Search ................ 524/571, 555, 828; 525/380, 329.1, 329.2, 329.3

[56] References Cited

U.S. PATENT DOCUMENTS 5,221,714  6/1993  Parker .................................. 525/237
5,309,737  8/1991  Parker et al. ........................ 524/804

Primary Examiner—Peter D. Mulcahy
Attorney, Agent, or Firm—Bruce J. Hendricks

[57] ABSTRACT

The present invention relates to a process for the preparation of a latex of hydrogenated elastomeric polymer comprising:

(1) combining an unsaturated polymer in latex form with (a) an oxidant selected from the group consisting of oxygen, air and hydroperoxide;

(b) a reducing agent selected from hydrazine and hydrates thereof; and (c) a metal ion activator;

(2) heating the mixture to a temperature from 0° C. to the reflux temperature of the reaction mixture;

(3) treating the mixture with ozone in an amount and under conditions which are sufficient for the ozone to react with residual polymer unsaturation to form an ozonated latex of elastomeric polymer having at least one terminal aldehyde end group;

(4) treating the ozonated latex with hydroxylamine in an amount and under conditions which are sufficient to convert aldehyde end groups of the elastomeric polymer to oxime end groups to form a oximated polymer latex.

9 Claims, No Drawings

PROCESS FOR THE PREPARATION OF HYDROGENATED RUBBER

BACKGROUND OF THE INVENTION

As revealed by Parker et al in Rubber Chem. & Tech., Vol. 65, 245 (1992), NBR latexes that are converted to hydrogenated NBR latexes by the method disclosed in U.S. Pat. No. 4,452,950 are prone to an undefined crosslinking side reaction that occurs concurrently with the desired reduction of double bonds. This crosslinking reaction produces "gelled" or "crosslinked" saturated hydrogenated NBR latex particles. For many latex applications, this crosslinking can have a beneficial effect. For instance, latex cast films from such a material may form continuous rubber coatings with good tensile, elongation and elastic recovery properties. Unfortunately, however, when highly crosslinked latexes are coagulated by common techniques known in the art, the resulting dry rubber mass is unprocessable and unable to flow to any significant extent because of its macroscopic three dimensional crosslinked structure. The material essentially has an "infinite" molecular weight in this form and cannot be processed by conventional rubber equipment.

One possible solution to this dilemma was revealed in U.S. Pat. No. 5,039,737 whereby the crosslinked "hydrogenated" NBR latex prepared by U.S. Pat. No. 4,452,950 is first treated with ozone to cleave residual unreduced double bonds. This treatment resulted in lowering the molecular weight of the rubber with concurrent generation of both terminal aldehyde and carboxylic acid end groups at the cleavage sites. Unfortunately, although the originally crosslinked hydrogenated NBR rubber can be made soluble in a good solvent for hydrogenated NBR (e.g. chloroform) if immediately coagulated from the latex and redissolved, upon drying, the soluble rubber recrosslinks again to become useless. This problem could be overcome, however, as revealed in U.S. Pat. No. 5,039,737 by reducing the terminal aldehyde groups in the polymer using the strong and relatively expensive reducing agent . . . sodium borohydride, in ethanol solution. Presumably, the aldehyde groups are converted to terminal polymeric alcohol groups (after hydrolysis of the borate intermediates) that are not prone to recrosslinking since the resulting polymer is reported to remain soluble. Unfortunately, this method of using sodium borohydride to obtain a soluble processable hydrogenated NBR rubber is cumbersome, expensive, uses alcohol solvents and evolves hazardous hydrogen gas during the process.

In contrast to the process described in U.S. Pat. No. 4,452,950 and in Rubber Chem. & Tech., Vol. 65, 245 (1992), commercial hydrogenated NBR dry rubber is prepared by a completely different technique. In this method, dry NBR rubber is first ground into particles and then dissolved in a solvent. To the resulting cement is then added a noble metal catalyst. The mixture is then subjected to hydrogen pressure at elevated temperatures to effect reduction of the double bonds. Solvent and the expensive catalyst are then removed in a series of steps resulting in hydrogenated NBR rubber that has essentially the same molecular weight and structure as the original NBR. Therefore, if the original NBR was processable, the resulting hydrogenated NBR most likely will be processable as well. Whereas this method will easily produce processable hydrogenated NBR, it suffers from being an extremely costly and complicated process. Hazardous hydrogen gas is used and solvents and valuable metal catalysts are unable to be fully recovered.

DETAILED DESCRIPTION OF THE INVENTION

The present invention relates to a process for the preparation of a latex of hydrogenated elastomeric polymer comprising:

(1) combining an unsaturated polymer in latex form with (a) an oxidant selected from the group consisting of oxygen, air and hydroperoxide;

(b) a reducing agent selected from hydrazine and hydrates thereof; and (c) a metal ion activator;

(2) heating the mixture to a temperature from 0° C. to the reflux temperature of the reaction mixture;

(3) treating the mixture with ozone in an amount and under conditions which are sufficient for the ozone to react with residual polymer unsaturation to form an ozonated latex of elastomeric polymer having at least one terminal aldehyde end group;

(4) treating the ozonated latex with hydroxylamine in an amount and under conditions which are sufficient to convert aldehyde end groups of the elastomeric polymer to oxime end groups to form a oximated polymer latex.

There is also disclosed a novel oximated polymer latex which is prepared in accordance with the process of the present invention.

There is also disclosed a novel dry rubber which is derived from the oximated polymer latex prepared in accordance with the present invention.

The process of the present invention begins with an unsaturated polymer in latex form. The unsaturated polymers useful in this invention are composed of 5 to 100 percent by weight of a conjugated diene monomer unit and 95 to 0% by weight of an ethylenically unsaturated monomer unit. Specific examples of the conjugated diene monomer are 1,3-butadiene, 2,3-dimethylbutadiene, isoprene and 1,3-pentadiene, specific examples of the ethylenically unsaturated monomer include unsaturated nitriles such as acrylonitrile and methacrylonitrile, monovinyl aromatic hydrocarbons such as styrene (o-, m- and p-) alkylstyrenes, divinyl aromatic hydrocarbons such as divinylbenzene, dialkenyl aromatics such as diisopropenylbenzene, unsaturated carboxylic acids and the esters thereof such as acrylic acid, methacrylic acid, crotonic acid, iraconic acid, maleic acid, methyl acrylate, ethyl acrylate, butyl acrylate, 2-ethylhexyl acrylate and methyl methacrylate; vinylpyridine; vinylidene chloride and vinyl esters such as vinyl acetate.

The unsaturated polymer may be one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile/butadiene (random or blocked) copolymer, a butadiene/isoprene copolymer, and an isopreneisobutylene copolymer. The preferred polymer is an acrylonitrile/butadiene copolymer (NBR).

It is preferred that the polymer be prepared in an aqueous emulsion polymerization without prior coagulation or use of organic solvents. If the polymer to be hydrogenated is not in the latex form, then through known techniques, the polymer must be placed in a latex form.

Conventional cold or hot emulsion recipes may be employed to prepare the unsaturated polymer in latex form. Conventional ionic surfactants, known in the art, including sulfonate detergents and carboxylate soaps are useful in the instant invention. The level of ionic surfactant is computed based upon the total weight of monomers charged and ranges from 1 to 30 parts by weight of ionic surfactant per 100 parts by weight of monomer (phm) with 1–15 phmbeing more preferred and 2–10 phmbeing most preferred.

The process of the present invention is not dependent on any particular initiator, activator, reducing agent, complex forming agent, buffer, oxygen-combining substances, emulsifier, dispersing agent, modifier and the like being used to prepare the unsaturated polymer in latex form.

The unsaturated polymer in latex form is prepared by polymerizations in which the metal compounds of the redox system are completely (or almost completely) complexed; that is to say, that the polymerization is carried out in the presence of enough complexing agent that at least 90% of the metal compound was caused to react with it to form a water-soluble complex compound. These complexing agents therefore constitute part of the redox system and are already present at the beginning of the polymerization. A very suitable complexing agent is, for instance, a mixture of 90% of tetrasodium salt of ethylene-diaminetetraacetic acid and 10% of monosodium salt of N,N-di(alpha-hydroxyethyl) glycine. Another suitable complexing agent is the disodium salt of ethylene diaminetetraacetic acid.

Free radical initiators known in the art are useful in preparing the polymer in latex form. For example, persulfate systems and azonitrile systems are conventionally used in hot emulsion recipes. Examples of free radical initiators conventionally used in cold emulsion recipes include combinations of chelated iron salts, sodium formaldehyde sulfoxylate and organic hydroperoxides. Representative of organic hydroperoxides are cumene hydroperoxide, paramenthane hydroperoxide, diisopropylbenzene hydroperoxide, pinene hydroperoxide, and tertiary butyl hydroperoxide.

The redox recipes applied in the polymerization include an initiator (hydroperoxide) and an activator, which as a rule consists of several components (among which is the metal compound). These recipes are often varied so that other quantities are applied of the initiator and/or of the activator. The specified values can then be designated as the 100% or the 100/100 level, the desired modifications being expressed in percentages thereof, for instance 50% level or initiator/activator level=50/50.

Activators usually comprise heavy metal (Nos. 23–29 of the Periodic Table) water soluble salts, such as ferrous sulfate, cobalt chloride, cuprous chloride, nickel sulfate, etc.

It may in certain cases be advisable to polymerize at such an initiator level that, at reaching the desired conversion, the initiator is nearly consumed. This may, for instance, be effectuated by choosing a low ratio between the initiator level and the activator level, for instance between 0.4 and 0.6.

The temperature of the emulsion polymerization may range from 0° C. to 100° C. If a hot polymerization recipe is used, the temperature of the polymerization generally ranges from about 40° C. to about 100° C. Preferably, the temperature of the hot polymerization ranges from about 45° C. to about 80° C., with a range of from about 50° C. to about 70° C. being particularly preferred. The hot polymerization is generally carried out to monomer conversion ranging from 80% to 100%. The temperature of the cold polymerization generally ranges from about 0° C. to 25° C. Preferably, the temperature of the cold polymerization ranges from about 5° C. to 20° C. with a range of from about 5° C. to 15° C. being particularly preferred. The cold polymerization is generally carried out to monomer conversion ranging from about 65 to 100 percent. In addition, a chain transfer agent is generally used in order to avoid excessive gel formation and control the average molecular weight.

Conventional shortstopping agents may be used in amounts generally ranging from about 0.01 to 2.0 phm (parts per hundred parts of monomer). The manner by which the shortstopping agent is added is in accordance with conventional techniques used in rubber polymerization processes.

Polymerizable antidegradants may also be present during the emulsion polymerization. For example, U.S. Pat. Nos. 3,658,789 and 3,767,628 herein incorporated by reference disclose various amide and imide antidegradants which are copolymerized with conventional monomers in a free radical polymerization.

The weight average molecular weight of the polymer latex may vary widely. Generally, the weight average molecular weight ranges from about 10,000 to about 2,000,000. Preferably, the molecular weight will range from about 30,000 to 500,000. Most preferably, weight average molecular weights between 30,000 and 200,000 are used.

The latex form of the polymer may be hydrogenated as such. The concentration of the latex can range from 1 to 70% by weight, preferably from 20 to 50% by weight.

The diimide hydrogenation reaction is preferably carried out in an open vessel. The reaction temperature is 0° to 300° C., preferably 40° to 80° C. Pressure vessels are not required, nor are they preferred, however, pressures can range from atmospheric pressure to 300 kg/cm$^2$.

Thirty percent to fifty percent hydrogen peroxide will typically be utilized as the oxidant in carrying out the "hydrogenation" process. However, it is also possible to utilize oxygen, air or other oxidants such as cumyl hydroperoxide, t-butyl hydroperoxide, p-methane hydroperoxide, and the like.

A wide variety of metals having ions or salts which will react with hydrazine can be utilized as the metal ion activator. Antimony, arsenic, bismuth, cerium, chromium, cobalt, copper, gold, iron, lead, manganese, mercury, molybdenum, nickel, osmium, palladium, platinum, cerium, silver, tellurium, tin, and vanadium are representative of metal ions which will react with hydrazine and which are useful in the "hydrogenation step" as the metal ion activator. Iron and copper are preferred metal ion activators with copper being most preferred.

Any solvent which does not adversely affect latex stability of the "hydrogenation" reaction and catalyst may be present in small amounts. Preferably, a solvent is used which does not interfere with the subsequent ozonation or oximation step. An acceptable solvent is toluene. However, it is preferred that no solvent be present.

Such hydrogenated rubbers will typically have a saturation level of about 1 to about 99%. However, it is preferred for the hydrogenated rubber to have a saturation level of about 85% to about 90% of its olefin content (derived from diene monomer). The reduction reaction may be conveniently followed by infrared spectroscopy (FTIR) or by NMR techniques.

Ozone is simply mixed with the latex containing the hydrogenated polymer for a period of time which is sufficient to attain the desired results. This can be accomplished by bubbling ozone through the latex. It can also be done by rapidly agitating the latex under an ozone containing atmosphere. It may be desirable for the ozone containing atmosphere to be under pressure. Other techniques for mixing ozone throughout the latex being treated can also be employed.

The temperature at which the ozone treatment step is carried out is not critical. In fact, virtually any temperature between the freezing point of the latex and its boiling point can be utilized. However, for practical reasons, the latex will normally be treated with ozone at a temperature which is within the range of about 0° C. to about 80° C. A temperature within the range of about 15° C. to about 40° C. will most preferably be employed. Higher temperatures can result in reduced solubility of the ozone in the latex even though faster reaction rates may be attained.

The ozone treatment will be carried out for a time which is sufficient to eliminate undesirable levels of crosslinking. The treatment time employed will typically be within the range of about 15 minutes to about 6 hours depending on ozone content of gas, polymer olefin content and desired degree of cleavage. The period of time utilized in treating the latex with ozone will more typically be within the range of about 30 minutes to about 2 hours.

The gelation which can occur during the hydrogenation step is essentially due to an ill-defined crosslinking side reaction of the elastomeric polymer in the emulsion. By treating the emulsion of the crosslinked elastomeric polymer with ozone, an ozonolysis reaction occurs. In this ozonolysis reaction, the remaining double bonds in the crosslinked rubber are attacked with ozonides being formed. The ozonides formed under the low temperature condition of the reaction are highly unstable and are destroyed by caustic hydrolysis with the water in the latex. Caustic hydrolysis of ozonides are known to produce equal molar amounts of carboxylic acid and aldehyde end groups. The carboxylic acid terminated end groups do not pose a problem as do the aldehyde end groups.

The FTIR analysis technique has proven useful to qualitatively monitor functional group transformation during various stages of the process. For example, aldehyde and carboxyl functionality generated on the polymer during ozonolysis can readily be seen. Further changes are evident when the terminal aldehyde groups are reacted with the hydroxylamine.

The ozonated latex containing the elastomeric polymer having at least one terminal aldehyde group is then treated with hydroxylamine in an amount and under conditions which are sufficient to react with the aldehyde end groups of the elastomeric polymer to produce oxime end groups. The amount of hydroxylamine that is used may vary. Generally speaking, the amount of hydroxylamine may range from about 1 to 5 moles per mole of aldehyde end groups of the elastomeric polymer. Preferably, the amount of hydroxylamine ranges from about 1 to 2 moles per mole of aldehyde end groups. The hydroxylamine that is used is preferably the salt-free base. In addition, the hydroxylamine is preferably an aqueous solution. A particularly preferred hydroxylamine salt-free 50% aqueous solution is commercially available from the Howard Hall Division of R. W. Greef & Co., Inc. under the designation FH-50.

The ozonated latex is preferably treated with the hydroxylamine under agitation at a temperature ranging from about 25° to about 80° C. Preferably, the reaction temperature is from about 50° to 75° C.

The hydroxylamine treatment will be carried out for a time which is sufficient to convert any aldehyde end groups of the elastomeric polymer to oxime end groups. The treatment time will typically be within the range of about ½ hour to 5 hours. The period of time utilized in treating the ozonated latex with hydroxylamine will more typically be within the range of about 1 hour to 2 hours.

After the ozonated latex has been treated with hydroxylamine to form a oximated polymer latex, the oximated latex is coagulated in a conventional manner. Standard procedures such as salt/acid, aluminum sulfate or alcohol solution coagulation procedures may be used. After coagulation has been completed, the coagulated hydrogenated rubber may be dried in a conventional manner such as in an oven.

Example 1

I. Preparation of NBR Latex

Using general emulsion polymerization techniques and ingredients, an acrylonitrile/butadiene latex containing 1.5 parts by weight of the polymerizable antioxidant monomer, N-(4-anilino-phenyl) methacrylamide was polymerized to essentially 100 percent conversion at 18° C. The polymer latex had the following properties:

| Conversion | ca. 100% |
| --- | --- |
| % Solids | 39.7 |
| Brookfield Viscosity (cps) | 22.5 |
| Surface Tension (dynes/cm) | 54.0 |
| Particle Size: # avg. (nm) | 72.4 |
| Vol. avg. (nm) | 79.9 |

Analysis of the isolated polymer from this latex gave the following results:

| % Bound Acrylonitrile | 39.0% |
| --- | --- |
| Dil. Soln. Vis. (dl/g) | 0.422 |
| Mol. Wgt. Mn | ca. 13,000 |
| Mw | ca. 42,000 |
| % Total gel | ca. 1% |

II. Reduction

A 5 liter three-necked round bottom flask equipped with a mechanical paddle stirrer, thermometer, reflux condenser and an inlet tube for feeding hydrogen peroxide solution was charged with 1312.5 grams of the NBR latex (491.4 grams of rubber). This quantity of rubber was calculated to contain 5.551 moles of double bonds. To the stirred latex at room temperature was added 277.55 grams of 64% aqueous hydrazine (5.551 moles, 100% of theory based on moles of double bonds present) and a mixture of 2.781 grams of Poly-Terg 2EP ® (a 48% active aqueous solution of disodium dodecyldiphenylether disulfonate) and 2.78 grams of a 4.97% copper sulfate pentahydrate solution; (0.0005551 moles cupric ion). The mixture was the heated in a constant temperature bath to 40°-50° C. before beginning the addition of 410 grams (5.96 moles) of 49.4% aqueous hydrogen peroxide dropwise by means of a syringe pump over a 16 hour period. Analysis of the reduced polymer indicated approximately 85-90% reduction of the double bonds had been achieved. The Mooney viscosity of the isopropanol coagulated dry rubber was found to be 127.

III. Ozonation

Through the above reduced latex was passed 0.061 moles of ozone as an air/ozone mixture at 40°-50° C. using a glass tube to introduce the gas near the bottom of the stirred latex. The flask was then heated to 70°-75° C.

IV. Oximation

To the warmed latex from above was then added 0.122 moles of a 50% aqueous solution of salt-free hydroxylamine. The mixture was allowed to react for one hour before a small portion of latex was withdrawn for coagulation and Mooney viscosity determination. The dried polymer was determined to have an ML-4 value of 98.

Passage of an additional 0.030 moles of ozone through the latex followed by an additional 0.061 moles of 50% aqueous hydroxylamine resulted in an ML-4 value of 45 for the isolated rubber.

Example 2

A duplicate reduction to that of Example 1 was run. The latex was then treated with 0.0763 moles of ozone as above followed by the addition of 0.183 moles of 50% hydroxylamine solution. After reacting for 2 hours at 70°-75° C., a sample was isolated and its ML-4 value determined to be 65.

What is claimed is:

1. A process for the preparation of a latex of hydrogenated elastomeric polymer comprising:
   (1) combining an unsaturated polymer in latex form with
   (a) an oxidant selected from the group consisting of oxygen, air and hydroperoxide;
   (b) a reducing agent selected from hydrazine and hydrates thereof; and
   (c) a metal ion activator;
   (2) heating the mixture to a temperature from 0° C. to the reflux temperature of the reaction mixture;
   (3) treating the mixture with ozone in an amount and under conditions which are sufficient for the ozone to react with residual polymer unsaturation to form an ozonated latex of elastomeric polymer having at least one terminal aldehyde end group;
   (4) treating the ozonated latex with hydroxylamine in an amount and under conditions which are sufficient to convert aldehyde end groups of the elastomeric polymer to oxime end groups to form a oximated polymer latex.

2. The process of claim 1 wherein said oximated polymer latex is coagulated.

3. The process of claim 2 wherein said oximated polymer latex is dried after coagulation.

4. The process of claim 1 wherein the amount of hydroxylamine that is reacted ranges from about 1 mole to 5 moles per mole of aldehyde end groups.

5. The process of claim 1 wherein the ozonated latex is treated with hydroxylamine at a temperature ranging from about 50° to 75° C.

6. The process of claim 1 wherein the ozonated latex is treated with hydroxylamine for a period of time ranging from about ½ hour to 5 hours.

7. The process of claim 1 wherein the hydroxylamine is salt-free.

8. The process of claim 1 wherein said unsaturated polymer in latex form is prepared from 5 to 100 percent by weight of a conjugated diene monomer units and 95 to 0 percent by weight of ethylenically unsaturated monomer units.

9. The process of claim 1 wherein the unsaturated polymer is NBR.

* * * * *